US012232157B2

(12) United States Patent
Wang et al.

(10) Patent No.: US 12,232,157 B2
(45) Date of Patent: Feb. 18, 2025

(54) SIDELINK TRANSMISSION METHOD AND TERMINAL

(71) Applicant: DATANG MOBILE COMMUNICATIONS EQUIPMENT CO., LTD., Beijing (CN)

(72) Inventors: Da Wang, Beijing (CN); Yali Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 519 days.

(21) Appl. No.: 17/604,734

(22) PCT Filed: Mar. 27, 2020

(86) PCT No.: PCT/CN2020/081714
§ 371 (c)(1),
(2) Date: Oct. 18, 2021

(87) PCT Pub. No.: WO2020/220885
PCT Pub. Date: Nov. 5, 2020

(65) Prior Publication Data
US 2022/0183018 A1    Jun. 9, 2022

(30) Foreign Application Priority Data
Apr. 28, 2019    (CN) .......................... 201910351340.1

(51) Int. Cl.
*H04W 72/542* (2023.01)
*H04L 1/1812* (2023.01)
(Continued)

(52) U.S. Cl.
CPC ......... *H04W 72/542* (2023.01); *H04L 1/1812* (2013.01); *H04W 72/0446* (2013.01); *H04W 72/20* (2023.01); *H04W 72/52* (2023.01)

(58) Field of Classification Search
CPC .......... H04W 72/542; H04W 72/0446; H04W 72/20; H04W 72/52; H04W 72/54;
(Continued)

(56) References Cited
U.S. PATENT DOCUMENTS
2019/0342910 A1*  11/2019  Cao ...................... H04L 5/0091
2020/0092692 A1    3/2020  Wang et al.
(Continued)

FOREIGN PATENT DOCUMENTS
CN    108923885 A    11/2018
CN    108923894 A    11/2018
(Continued)

OTHER PUBLICATIONS
CATT, "Discussion on resource allocation mechanism for sidelink Mode 2 in NR V2X", R1-1905353, 3GPP TSG RAN WG1 Meeting #96bis, Xi'an, China, Apr. 8-12, 2019, all pages.
(Continued)

*Primary Examiner* — Ricardo H Castaneyra
(74) *Attorney, Agent, or Firm* — Ladas & Parry, LLP

(57) ABSTRACT

The present disclosure provides a sidelink transmission method and a terminal. The method includes: determining, by a first terminal, that first information is transmitted 1 or N times according to configuration information, wherein N is a positive integer greater than 1; if it is determined that the first information is transmitted N times, transmitting, by the first terminal, the first information to a second terminal N times on a sidelink; if it is determined that the first information is transmitted once, transmitting, by the first terminal, the first information to the second terminal once on the sidelink.

17 Claims, 5 Drawing Sheets

(51) Int. Cl.
*H04W 72/0446* (2023.01)
*H04W 72/20* (2023.01)
*H04W 72/52* (2023.01)

(58) Field of Classification Search
CPC . H04W 40/24; H04W 28/0268; H04W 28/10;
H04W 92/18; H04W 76/14; H04W 76/27;
H04W 76/40; H04W 4/40; H04W 24/02;
H04L 1/1812; H04L 1/189; H04L 1/08;
H04L 1/1864; H04L 1/1893
See application file for complete search history.

(56) References Cited

U.S. PATENT DOCUMENTS

| | | | |
|---|---|---|---|
| 2020/0137782 A1 | 4/2020 | Su et al. | |
| 2020/0295883 A1* | 9/2020 | Lee | H04L 5/0057 |
| 2020/0314804 A1* | 10/2020 | Shin | H04L 5/0055 |
| 2021/0022131 A1* | 1/2021 | Liu | H04W 72/23 |

FOREIGN PATENT DOCUMENTS

| | | |
|---|---|---|
| CN | 109217989 A | 1/2019 |
| CN | 109428680 A | 3/2019 |
| EP | 3764670 A1 | 1/2021 |
| WO | 2016165515 A1 | 10/2016 |
| WO | 2019001409 A1 | 1/2019 |

OTHER PUBLICATIONS

Huawei, HiSilicon, "Reliability enhancements for NR sidelink broadcast", R2-1816516, 3GPP TSG-RAN WG2 Meeting #104, Spokane, USA, Nov. 12-16, 2018, all pages.
First Office Action from TW app. no. 109111437, dated Feb. 23, 2022, with machine English translation provided by applicant, all pages.
International Search Report from PCT/CN2020/081714, dated Jun. 30, 2020, with English translation from WIPO, all pages.
Written Opinion of the Ir International Searching Authority from PCT/CN2020/081714, dated Jun. 30, 2020, with English translation from WIPO, all pages.
International Preliminary Report on Patentability from PCT/CN2020/081714, dated Nov. 2, 2021, with English translation from WIPO, all pages.
Extended European Search Report for European Patent Application 20798755.3, issued on May 31, 2022.

* cited by examiner

SIDELINK TRANSMISSION METHOD AND TERMINAL

CROSS-REFERENCE TO RELATED APPLICATIONS

This application is the U.S. national phase of PCT Application No. PCT/CN2020/081714 filed on Mar. 27, 2020, which claims priority to the Chinese patent application No. 201910351340.1 filed on Apr. 28, 2019, the disclosures of which are incorporated herein by reference in their entireties.

TECHNICAL FIELD

The present disclosure relates to the field of communications technology, in particular to a sidelink transmission method and a terminal.

BACKGROUND

In addition to the original broadcast communication mode, New Radio (NR) vehicle to everything (V2X) technology has newly introduced a unicast communication mode and a multicast communication mode. However, because the broadcast communication mode often only supports to transmit information once, the transmission reliability of the sidelink is relatively poor.

SUMMARY

An object of the present disclosure is to provide a sidelink transmission method and a terminal, thereby solving the problem of poor transmission reliability of the sidelink.

An embodiment of present disclosure provides a sidelink transmission method, including: determining, by a first terminal, that first information is transmitted 1 or N times according to configuration information, wherein N is a positive integer greater than 1; if it is determined that the first information is transmitted N times, transmitting, by the first terminal, the first information to a second terminal N times on a sidelink; if it is determined that the first information is transmitted once, transmitting, by the first terminal, the first information to the second terminal once on the sidelink.

Optionally, the configuration information is network configuration information or pre-configured information.

Optionally, the network configuration information is configuration information sent by a network device through a broadcast message or a radio resource control (RRC) signaling; and/or the pre-configured information is information configured by the network device or the first terminal in advance for the first terminal, or, the pre-configured information is information agreed by a protocol.

Optionally, in the case that the first terminal determines that the first information is transmitted N times, the first terminal or the network device instructs to the second terminal at least one of the following: a value of N; or a resource location occupied by N times of transmission of the first information.

Optionally, the first terminal instructs through sidelink control information SCI or a sidelink RRC signaling; or the network device instructs through a broadcast message or a RRC signaling.

Optionally, the broadcast message is used by the first terminal to determine that the first information is transmitted 1 or N times.

Optionally, in the case that the first terminal enables Hybrid Automatic Repeat Request (HARQ) feedback, during one transmission process, the first information is only transmitted once; and/or in the case that the first terminal disables the HARQ feedback, the first terminal determines, according to the configuration information, that the first information is transmitted 1 or N times.

Optionally, the first terminal determines to enable or disable the HARQ feedback according to at least one of the following: network configuration information, pre-configured information, a channel state, service characteristics or quality of service (QoS).

Optionally, in the case that link information of the sidelink meets a preset condition, the first terminal determines that the first information is transmitted N times according to the configuration information; and/or in the case that the link information of the sidelink does not meet the preset condition, the first information is only transmitted once during one transmission process; wherein the link information includes a link state and/or link service information.

Optionally, in the case that the second terminal is one terminal, the link information of the sidelink meeting the preset condition refers to at least one of the following: a sidelink channel state is lower than a channel state threshold; a sidelink channel congestion degree is lower than a channel congestion threshold; sidelink service QoS is higher than a service QoS threshold;

or, in a case where the second terminalis a plurality of terminals, the link information of the sidelink meeting a preset condition refers to at least one of the following: a proportion of the sidelink channel state being lower than the channel state threshold is higher than a first proportion threshold; a proportion of the sidelink channel congestion degree being lower than the channel congestion threshold is higher than a second proportion threshold; or the sidelink QoS is higher than the service QoS threshold.

Optionally, the QoS includes at least one of the following: reliability, a delay, a priority or a communication range.

Optionally, in the case that the second terminal is one terminal, the link information of the sidelink meeting a preset condition refers to: the sidelink service QoS is higher than the service QoS threshold; or in the case that the sidelink service QoS is not higher than the service QoS threshold, the sidelink channel congestion degree is lower than the channel congestion threshold;

or, in the case that the second terminal is a plurality of terminals, the link information of the sidelink meeting the preset condition refers to: the sidelink service QoS is higher than the service QoS threshold; or in the case that the sidelink service QoS is not higher than the service QoS threshold, the proportion of the sidelink channel congestion degree being lower than the channel congestion threshold is higher than the second proportion threshold.

Optionally, the channel state threshold includes a first channel state threshold and a second channel state threshold, the first channel state threshold is greater than the second channel state threshold; in the case that it is determined that the first information is transmitted N times according to the configuration information, a value range of N is N1 and N2, and N2 is a positive integer greater than or equal to N1, and N1 is an integer greater than 1, in the case that the sidelink channel state is lower than the second channel state threshold, a value of N is N2, and in the case that the sidelink channel state is lower than the first channel state threshold and higher than the second channel state threshold, the value of N is N1; or the channel congestion threshold includes a first channel congestion threshold and a second channel congestion threshold, wherein the first channel congestion threshold is greater than the second channel congestion threshold; and when it is determined that the first information is transmitted N times according to the configuration information, a value range of N is N3 and N4, and N4 is a positive integer greater than or equal to N3, and N3 is an integer greater than 1, in the case that the sidelink channel congestion degree is lower than the second channel congestion threshold, the value of N is N4, and in the case that the sidelink channel congestion degree is lower than the first channel congestion threshold and higher than the second channel congestion threshold, the value of N is N3; or the service QoS threshold includes a first service QoS threshold and a second service QoS threshold, wherein the first service QoS threshold is greater than the second service QoS threshold; and in the case that it is determined that the first information is transmitted N times according to the configuration information, a value range of N is N5 and N6, and N6 is a positive integer greater than or equal to N5, and N5 is an integer greater than 1, in the case that the sidelink service QoS is higher than the first service QoS threshold, the value of N is N6, and in the case that the sidelink service QoS is higher than the first service QoS threshold and lower than the second service QoS threshold, the value of N is N5; or the first proportion threshold includes a first channel state proportion threshold and a second channel state proportion threshold, wherein the first channel state proportion threshold is greater than the second channel state proportion threshold, in the case that it is determined that the first information is transmitted N times according to the configuration information, a value range of N is N6 and N7, and N7 is a positive integer greater than or equal to N6, and N6 is an integer greater than 1, in the case that the proportion of the sidelink channel state being lower than the channel state threshold is higher than the first channel state proportion threshold, the value of N is N7, and in the cast that the proportion of sidelink channel state being lower than the channel state threshold is higher than the second channel state proportion threshold and lower than the first channel state proportion threshold, the value of N is N6; or the second proportion threshold includes a first channel congestion proportion threshold and a second channel congestion proportion threshold, wherein the first channel congestion proportion threshold is greater than the second channel congestion proportion threshold; in the case that it is determined that the first information is transmitted N times according to the configuration information, a value range of N is N8 and N9, and N9 is a positive integer greater than or equal to N8, and N8 is an integer greater than 1, in the case that the proportion of the sidelink channel congestion degree being lower than the channel congestion threshold is higher than the first channel congestion proportion threshold, the value of N is N9, and in the case that the proportion of sidelink channel congestion degree being lower than the channel congestion threshold is higher than the second channel congestion proportion threshold and lower than the first channel congestion proportion threshold, the value of N is N8.

Optionally, at least one of the channel state threshold, the channel congestion threshold, the service QoS threshold, the first proportion threshold, or the second proportion threshold is configured by network configuration information or pre-configured information.

Optionally, the network configuration information is used by the first terminal to determine that the first information is transmitted 1 or N times; or the pre-configured information is used by the first terminal to determine that the first information is transmitted 1 or N times.

Optionally, a redundancy version (RV) number of each transmission of the first information among N times of transmission of the first information is the same or different; or the RV number of each transmission of the first information among N times of transmission of the first information is agreed by the protocol or configured by the network device or pre-configured.

Optionally, the first terminal instructs a RV number of currently transmitted information to the second terminal through SCI or a sidelink RRC signaling.

An embodiment of the present disclosure provides a terminal, being a first terminal, including: a determining module, configured to determine that first information is transmitted 1 or N times according to configuration information, wherein N is a positive integer greater than 1; a first transmission module, configured to, if it is determined that the first information is transmitted N times, transmit, by the first terminal, the first information to a second terminal N times on a sidelink; a second transmission module is configured to, if it is determined that the first information is transmitted once, transmit, by the first terminal, the first information to the second terminal once on the sidelink.

Optionally, in the case that the first terminal determines that the first information is transmitted N times, the first terminal or the network device instructs to the second terminal at least one of the following: a value of N; or a resource location occupied by N times of transmission of the first information.

Optionally, in the case that the first terminal enables Hybrid Automatic Repeat Request (HARQ) feedback, during one transmission process, the first information is only transmitted once; and/or in the case that the first terminal disables the HARQ feedback, the first terminal determines, according to the configuration information, that the first information is transmitted 1 or N times.

Optionally, in the case that link information of the sidelink meets a preset condition, the first terminal determines that the first information is transmitted N times according to the configuration information; and/or in the case that the link information of the sidelink does not meet the preset condition, the first information is only transmitted once during one transmission process; wherein the link information includes a link state and/or link service information.

An embodiment of the present disclosure provides a terminal, being a first terminal, including: a transceiver, a memory, a processor, and a program stored on the memory and executed by the processor, the processor is configured to determine that first information is transmitted 1 or N times according to configuration information, wherein N is a positive integer greater than 1; the transceiver is configured to, if it is determined that the first information is transmitted N times, transmit the first information to a second terminal N times on a sidelink; the transceiver is further configured to, if it is determined that the first information is transmitted once, transmit the first information to the second terminal once on the sidelink;

or, the transceiver is configured to determine that first information is transmitted 1 or N times according to configuration information, wherein N is a positive integer greater than 1; the transceiver is further configured to, if it is determined that the first information is transmitted N times, transmit the first information to a second terminal N times on a sidelink; the transceiver is further configured to, if it is determined that the first information is transmitted once, transmit the first information to the second terminal once on the sidelink.

Optionally, the configuration information is network configuration information or pre-configured information.

Optionally, in the case that the first terminal determines that the first information is transmitted N times, the first terminal or the network device instructs to the second terminal at least one of the following: a value of N; or a resource location occupied by N times of transmission of the first information.

Optionally, in the case that the first terminal enables Hybrid Automatic Repeat Request (HARQ) feedback, during one transmission process, the first information is only transmitted once; and/or in the case that the first terminal disables the HARQ feedback, the first terminal determines, according to the configuration information, that the first information is transmitted 1 or N times.

Optionally, in the case that link information of the sidelink meets a preset condition, the first terminal determines that the first information is transmitted N times according to the configuration information; and/or in the case that the link information of the sidelink does not meet the preset condition, the first information is only transmitted once during one transmission process; wherein the link information includes a link state and/or link service information.

Optionally, the link state of the sidelink meeting a preset condition refers to at least one of the following: a sidelink channel state is lower than a channel state threshold; a sidelink channel congestion degree is lower than a channel congestion threshold; or sidelink service QoS is higher than a service QoS threshold.

An embodiment of the present disclosure provides a computer-readable storage medium with a computer program stored thereon, when the computer program is executed by a processor to implement the steps of the sidelink transmission method.

In the embodiment of the present disclosure, the first terminal determines that the first information is transmitted 1 or N times according to the configuration information, where N is a positive integer greater than 1; if it is determined that the first information is transmitted N times, the first terminal transmits the first information for N times on the sidelink to the second terminal; if it is determined that the first information is transmitted once, the first terminal transmits the first information once to the second terminal on the sidelink. In this way, since the transmission of N times can be supported, the transmission reliability of the sidelink can be improved.

DETAILED DESCRIPTION

In order to make the technical problem, technical solution, and advantage to be solved by the present disclosure clearer, a detailed description will be given below in conjunction with the accompanying drawings and specific embodiments.

Figure 1:
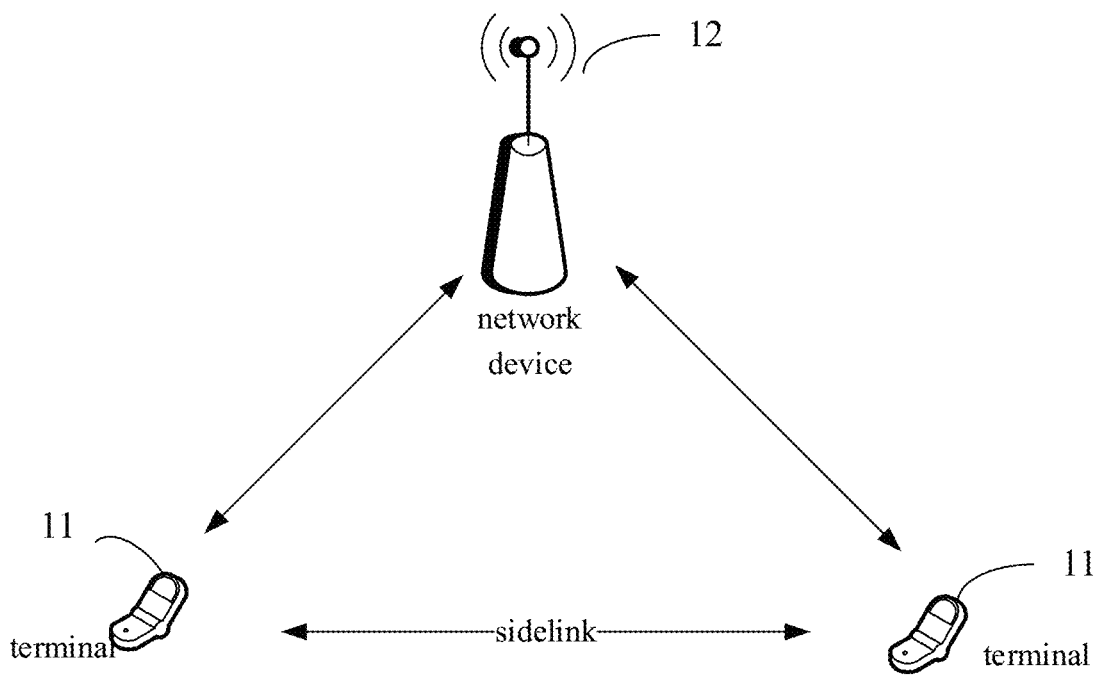
FIG. 1 is a structure diagram of a network structure according to one embodiment of the present disclosure.

FIG. 1 is a schematic diagram of a network structure applicable to the embodiments of the present disclosure. As shown in FIG. 1, a plurality of terminals 11 and network device 12 are included. The terminal 11 may be User Equipment (UE) or other terminal equipment, such as: mobile phones, Tablet Personal Computer, laptop computers, personal digital assistants (PDA), mobile Internet devices (MID), wearable devices, robots, vehicle-mounted terminals, vehicles, and other terminal-side devices. It should be noted that the specific types of terminals are not limited in the embodiments of the present disclosure. The sidelink that can directly communicate between the terminals 11 is called Sidelink (translated as a direct communication link or bypass, also called a direct communication interface or a sidelink interface), that is, the terminals can directly communicate through Sidelink. The terminals for direct communication may all be on the network or all off the network, or some devices may be on the network and some devices may be off the network. The network device 12 may be a base station, such as a macro station, a long term evolution (LTE) evolved node base station (eNB), and a fifth generation (5th generation, 5G) NR base station (NB). The network device can also be a small station, such as low power node (LPN), pico, femto, etc., or the network device can be an access point (AP); the base station can also be a network node composed of a central unit (CU) and multiple transmission reception points (TRP) managed and controlled by the central unit. The cellular communication link between the network device and the terminal-side device that directly communicates is called Device to Network (D2N) link, or Uu interface. It should be noted that the specific types of network devices are not limited in the embodiments of the present disclosure.

It should be noted that the embodiments of the present disclosure can be applied to an NR V2X network, and can also be applied to other networks that use a sidelink for communication, which is not limited by the embodiments of the present disclosure.

Figure 2:
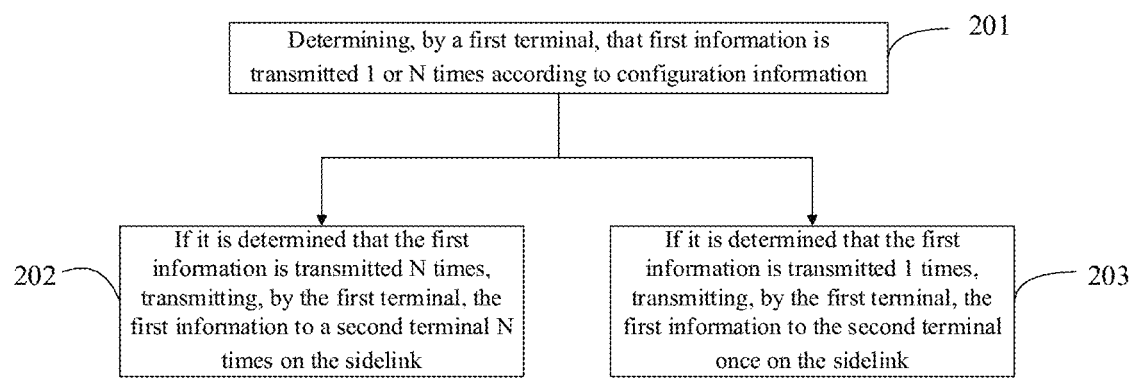
FIG. 2 is a flow chart of a sidelink transmission method according to one embodiment of the present disclosure.

FIG. 2 is a flowchart of a sidelink transmission method provided by an embodiment of the present disclosure. As shown in FIG. 2, it includes the following steps.

201. Determining, by a first terminal, that first information is transmitted 1 or N times according to configuration information, where N is a positive integer greater than 1.

202. If it is determined that the first information is transmitted N times, transmitting, by the first terminal, the first information to a second terminal N times on the sidelink.

203. If it is determined that the first information is transmitted once, transmitting, by the first terminal, the first information to the second terminal once on the sidelink.

Wherein, the above-mentioned configuration information may be network configuration information or pre-configured information. The network configuration information may be configuration information sent by the network device through a broadcast message or RRC signaling; and the pre-configured information may be information configured by the network device or the first terminal in advance for the first terminal, or, the pre-configured information is information agreed by a protocol.

In addition, the above-mentioned determining, by the first terminal, that the first information is transmitted 1 or N times according to the configuration information may be determining whether the first information is transmitted 1 or N times according to the configuration information. Wherein, the above configuration information may include repeated transmission times configuration information. The repeated transmission times configuration information is used to configure whether to perform transmission 1 or N times. For example, the repeated transmission times configuration information indicates the times of repeated transmission (1 or N). It may further include the value of N, that is, the value of N may be configured or pre-configured by the network device. In addition, the above configuration information may also include threshold information for determining whether the first information is transmitted 1 or N times, or the above configuration information may include condition information for the first information transmitted N times, which is not limited herein In addition, transmission of the first information for 1 or N times may be to transmit the first information 1 or N times during one transmission, or transmission of the first information for 1 or N times may be the total number of transmission of the first information. For example: when it is determined to perform transmission for once, it means that the first information is only transmitted once, that is, repeated transmission is not enabled. When it is determined to perform transmission for N times, that is, in addition to the initial transmission for once, the transmission is repeated N−1 times.

It should be noted that the foregoing second terminal may be one or more terminals, that is, the embodiments of the present disclosure may be applied to unicast, multicast, and broadcast scenarios. For broadcast and multicast scenarios, the second terminals are a plurality of receiving terminals. For a unicast scenario, the second terminal is one receiving terminal.

In the embodiment of the present disclosure, through the foregoing steps, it is possible to support to transmit the first information N times, so that the transmission reliability of the sidelink can be improved.

As an optional implementation, when the first terminal determines that the first information is transmitted N times, the first terminal or the network device indicates to the second terminal at least one of the following: a value of N; or a resource location occupied by N times of transmission of the first information.

For example: if the value of N is agreed by a protocol, configured by the network device to the second terminal or pre-configured by the second terminal, the first terminal or the network device may only indicate the resource location to the second terminal.

Wherein, the first terminal may indicate through sidelink signaling, for example, through SCI or sidelink RRC signaling to indicate the times N of transmission of the first information and/or the resource location occupied by N times of transmission of the first information, so that the second terminal receives the first information.

The network device may indicate through a broadcast message (System Information Block, SIB) or RRC signaling, for example, through terminal-specific RRC signaling to indicate to the second terminal the times N of transmission of the first information N and/or the resource location occupied by N times of transmission of the first information so that the second terminal receives the first information.

Wherein, the times of repeated transmission of the first information configured to the first terminal and the times of repeated transmission of the first information indicated to the second terminal may be configured to the first terminal and the second terminal together in one information, such as a SIB broadcast message, or may be configured to the first terminal and the second terminal in different information, such as an RRC message.

Further, the above-mentioned broadcast message may also be used by the first terminal to determine that the first information is transmitted 1 or N times. That is, when the configuration information in step 201 is network configuration information, the network configuration information can be used by the first terminal to determine that the first information is transmitted 1 or N times, and can also indicate to the second terminal at least one of the value of N or the resource location to save transmission overhead.

In this implementation, the first terminal or the network device may indicate the second terminal the times N of transmission of the first information or the resource location occupied by the N times of transmission of the first information, so as to facilitate the second terminal to receive the first information and improve the probability of receiving the first message successfully.

It should be noted that when it is determined that the first information is transmitted once, at least one of 1 times of transmission of first information and the occupied resource location may also be indicated through the above-mentioned indication manner.

As an optional implementation, when the first terminal enables HARQ feedback, during one transmission process, the first information is only transmitted once; and/or when the first terminal disables HARQ feedback, the first terminal determines, according to the configuration information, that the first information is transmitted 1 or N times.

Wherein, the first terminal may determine to enable or disable HARQ feedback according to at least one of the following: network configuration information, pre-configured information, a channel state, service characteristics and service QoS.

The network configuration information and pre-configured information here may be the configuration information in step 201. For example, the above-mentioned network configuration information may also be used by the first terminal to determine that the first information is transmitted 1 or N times; or, the pre-configured information may also be used by the first terminal to determine that the first information is transmitted 1 or N times. Of course, the network configuration information here may also be different configuration information from the configuration information in step 201. For example: the above-mentioned pre-configured information is not used by the first terminal to determine that the first information is transmitted 1 or N times, so that the first terminal can determine the first information transmitted 1 or N times according to other pre-configured information or the times of repeated transmission agreed by the protocol.

The enabling or disabling of HARQ feedback according to the channel state can be to enable or disable HARQ feedback corresponding to different channel states. For example, when the channel state is good, HARQ feedback can be disabled, and when the channel state is poor, HARQ feedback can be enabled, which is not limited.

The enabling or disabling the HARQ feedback according to the service characteristics may be, determining the enabling or disabling of the HARQ feedback according to the relationship between the service characteristics and the HARQ feedback, which is not limited.

The enabling or disabling of HARQ feedback according to service QoS may be, for example, according to service QoS, if the reliability requirement of the sidelink service is higher than a service reliability threshold, then HARQ feedback is enabled; otherwise, HARQ feedback is disabled. For example, according to the service QoS, if a delay requirement of the sidelink service is lower than a service delay threshold, HARQ feedback is enabled; otherwise, HARQ feedback is disabled, which is not limited.

In this implementation, it can be realized that when the first terminal enables HARQ feedback in the sidelink transmission, repeated transmission of the first information is stopped, that is, the first information is only transmitted once; when the first terminal disable HARQ feedback in the sidelink transmission, the repeated transmission of the first information is enabled, and it is determined that the first information is transmitted 1 or N times according to the configuration information, so that the reception success rate can be improved.

In the embodiment of the present disclosure, the first terminal may also determine that the first information is to transmitted 1 or N times according to at least one of a sidelink channel state, a sidelink channel congestion degree, and sidelink service information, as well as the configuration information.

As an optional implementation, in the case that the link information of the sidelink meets a preset condition, the first terminal determines that the first information is transmitted N times according to the configuration information; and/or in the case that the link information of the sidelink does not meet the preset condition, the first information is only transmitted once during one transmission; wherein the link information includes the link state and/or the link service information.

Wherein, the preset condition may correspond to at least one of the sidelink channel state, the sidelink channel congestion degree, and the sidelink service information. Of course, the preset condition may also correspond to other information, which is not limited.

For example: in the case where the second terminal is one terminal, the link information of the above-mentioned sidelink meeting the preset condition may be at least one of the following:

The channel state of the sidelink being lower than the channel state threshold;

The sidelink channel congestion level being lower than the channel congestion threshold;

The service quality QoS of the sidelink service is higher than the service QoS threshold.

It should be noted that the meeting the preset condition means that at least one of the above can be understood as, in one case, if any one of the above three items is met, it is considered that the above-mentioned preset condition is met, and in another case, if at least two of the above three items are met, the above preset conditions are considered to be met, or when at least one of the channel state of the sidelink being equal to the channel state threshold, the sidelink channel congestion degree being equal to the channel congestion threshold, and the service quality QoS of the sidelink being equal to the service QoS thresholds is met, it can also be considered that the preset condition is met, which is not limited here.

For example: in the case where the second terminal is one terminal, the sidelink information meeting the preset condition may refer to:

The QoS of sidelink service is higher than the service QoS threshold; or

In the case that the QoS of sidelink service is not higher than the service QoS threshold, the sidelink channel congestion degree is lower than the channel congestion threshold.

That is, when the QoS is higher than the service QoS threshold, the sidelink channel congestion degree is not considered, but when the QoS of sidelink service is not higher than the service QoS threshold, if the sidelink channel congestion degree is lower than the channel congestion threshold, the above-mentioned preset condition is met, to determine to perform transmission for N times.

In addition, in one case, the not meeting the preset condition may be that the sidelink channel state is not lower than the channel state threshold, or the sidelink channel congestion degree is not lower than the channel congestion threshold, or the QoS of the sidelink is not higher than the service QoS threshold. In another case, the not meeting the preset conditions may be that the sidelink channel state is not lower than the channel state threshold, or the sidelink channel congestion degree is not lower than the channel congestion threshold and the QoS of sidelink is not higher than the service QoS threshold. Or in another case, the not meeting the preset condition can mean that at least two of the sidelink channel state being not lower than the channel state threshold, the sidelink channel congestion degree being not lower than the channel congestion threshold, and the service QoS being not higher than the service QoS threshold are met.

It should be noted that the above three items need not to exist at the same time. For example, in some solutions, only the sidelink channel state, the sidelink channel congestion degree, or the sidelink service QoS are considered.

Among them, the above-mentioned sidelink channel state may be channel state information (CSI), rank indication (RI), channel quality indicator (CQI), signal to interference plus noise proportion (SINR) or Reference Signal Receiving Power (RSRP).

The channel state threshold may be a CSI threshold, an RI threshold, a CQI threshold, an SINR threshold, or an RSRP threshold.

In this embodiment, it can be realized that if the sidelink channel state is higher than the corresponding threshold, it indicates that the channel state is good, repeated transmission of the first information is stopped, that is, the first information is only transmitted once; if the sidelink channel state is lower than the corresponding threshold, it indicates that the channel status is poor, and the repeated transmission of the first information is enabled, and the first information is determined transmitted N times according to the configuration information, thereby improving the reception success rate.

Further, the channel state threshold may include a first channel state threshold and a second channel state threshold, wherein the first channel state threshold is greater than the second channel state threshold. In the case that it is determined that the first information is to transmitted N times according to the configuration information, the value range of N is N1 and N2, and N2 is a positive integer greater than or equal to N1, and N1 is an integer greater than 1, in the case that the sidelink channel state is lower than the second channel state threshold, the value of N is N2, and in the case that the sidelink channel state is lower than the first channel state threshold and higher than the second channel state threshold, the value of N is N1.

In this way, the lower the sidelink channel state is, the more the times of repeated transmission of the first information is, so as to further improve the reception success rate.

The sidelink channel congestion degree may be a channel busy proportion (CBR) threshold or a channel occupancy proportion (CR), etc. Then, the foregoing channel congestion threshold may be a CBR threshold or a CR threshold.

In this embodiment, if the sidelink channel congestion degree is higher than the corresponding threshold, it indicates that the channel is more congested, the repeated transmission of the first information is stopped, that is, the first information is only transmitted once; since the channel is already more congested, there are not many resources for transmission, so as to avoid occupying more transmission resources, and avoid the possibility that transmission resources cannot be selected or conflict with other terminals for sending information; if the sidelink channel congestion degree is lower than the corresponding threshold, it indicates that the channel is not congested, that is, the channel resources are relatively abundant, the repeated transmission of the first information is enabled, and it is determined that the first information is transmitted N times according to the times of repeated transmission which is configured by the network device or preconfigured, so as to improve the reception success rate.

Further, the channel congestion threshold may include a first channel congestion threshold and a second channel congestion threshold, where the first channel congestion threshold is greater than the second channel congestion threshold; and when it is determined that the first information is transmitted N times according to the configuration information, the value range of N is N3 and N4, and N4 is a positive integer greater than or equal to N3, and N3 is an integer greater than 1. When the sidelink channel congestion degree is lower than the second channel congestion threshold, the value of N is N4, and when the sidelink channel congestion degree is lower than the first channel congestion threshold and higher than the second channel congestion threshold, the value of N is N3.

In this way, the lower the sidelink channel congestion degree is, the higher the times of repeated transmission of the first information is, so as to further improve the reception success rate.

Among them, the QoS may include at least one of the following: a reliability, a delay, a priority or a communication range.

The service QoS threshold may be at least one of a reliability threshold, a delay threshold, a priority threshold, or a communication range threshold.

In this embodiment, it can be realized that for the sidelink service QoS, if the reliability is higher than the reliability threshold, it indicates that the service requires a higher reliability, or the delay is higher than the delay threshold, it indicates that the service requires a higher delay, or if the priority is higher than the priority threshold, it indicates that the service requires a higher priority, or if the communication range is higher than the communication range threshold, it indicates that the service requires a long communication range, and multiple times of transmission is required to reach the transmission distance, and then the repeated transmission of the first information is enabled, it is determined that the first information is transmitted N times according to the configuration information, thereby improving the reception success rate, avoiding retransmissions, and reducing transmission delay. For another example: for the sidelink service QoS, for example, if the reliability is lower than the reliability threshold, it indicates the reliability required by the service is not high, or if the delay is lower than the delay threshold, it indicates that the service requires a low delay, or if the communication range is lower than the communication range threshold, it indicates that the communication range required by the service is relatively short, and the transmission distance can be reached in 1 times of transmission, the repeated transmission of the first information is stopped, that is, the first information is only transmitted once, thereby reducing transmission overhead.

Further, the service QoS threshold may include a first service QoS threshold and a second service QoS threshold, where the first service QoS threshold is greater than the second service QoS threshold; and when it is determined that the first information is transmitted N times according to the configuration information, the value range of N is N5 and N6, and N6 is a positive integer greater than or equal to N5, and N5 is an integer greater than 1. When the sidelink service QoS is higher than the first service QoS threshold, the value of N is N6, and the sidelink service QoS is higher than the first service QoS threshold and lower than the second service QoS threshold, the value of N is N5.

In this way, the higher the sidelink service QoS is, the higher the times of repeated transmission of the first information is, so as to further improve the reception success rate.

Optionally, in a case where the second terminals are a plurality of terminals, the sidelink information meeting a preset condition refers to at least one of the following:
  a proportion of the sidelink channel state being lower than the channel state threshold is higher than a first proportion threshold;
  a proportion of the sidelink channel congestion degree being lower than the channel congestion threshold is higher than a second proportion threshold; or
  the sidelink service QoS is higher than the service QoS threshold.

Among them, the above-mentioned sidelink channel state, sidelink channel congestion degree, sidelink service QoS, and corresponding thresholds can be referred to the above description of the embodiment, which will not be repeated here.

The proportion of the sidelink channel state being lower than the channel state threshold is higher than a first proportion threshold may be that, the proportion of terminals whose sidelink channel state being lower than the channel state threshold to the plurality of terminals is higher than the first proportion threshold, the proportion of the sidelink channel congestion degree being lower than the channel congestion threshold is higher than the second proportion threshold may be that, the proportion of terminals whose sidelink channel congestion degree being lower than the channel congestion threshold to the plurality of terminals is higher than the second proportion threshold.

In addition, in one case, the not meeting the preset condition may be that the proportion of the sidelink channel state being lower than the channel state threshold is not higher than the first proportion threshold, or the proportion of the sidelink channel congestion degree being lower than the channel congestion threshold is not higher than the second proportion threshold, or the sidelink service quality QoS is not higher than the service QoS threshold. In another case, the not meeting the preset condition may be that the proportion of the sidelink channel state being lower than the channel state threshold is not higher than the first proportion threshold, or the proportion of the sidelink channel congestion degree being lower than the channel congestion threshold is not higher than the second proportion threshold and the service QoS is not higher than the service QoS threshold. In yet another case, the not meeting meet the preset condition may be that at least two of the followings are met: the proportion of the sidelink channel state being lower than the channel state threshold is not higher than the first proportion threshold, the proportion of the sidelink channel congestion degree being lower than the channel congestion threshold is not higher the second proportion threshold and the service QoS are not higher than the service QoS threshold.

It should be noted that the above three items need not to exist at the same time. For example, in some solutions, only the sidelink channel state, the sidelink channel congestion degree, or the sidelink service QoS are considered.

In this embodiment, it can be realized that when the proportiono of the sidelink channel state being lower than the channel state threshold (that is, the number of terminals whose sidelink channel state being lower than the channel state threshold/the number of the plurality of terminals) is higher than the first proportion threshold, the repeated transmission of the first information is enabled, and the first information is determined transmitted N times according to the configuration information; otherwise, the repeated transmission of the first information is stopped, that is, the first information is only transmitted once.

It can also be realized when the proportion of sidelink channel congestion degree being lower than the channel congestion threshold (that is, the number of terminals whose sidelink channel congestion degree being lower than the channel congestion threshold/the number of the plurality of terminals) is higher than the second proportion threshold, the repeated transmission of the first information is enabled, and the first information is determined transmitted N times according to the configuration information; otherwise, the repeated transmission of the first information is stopped, that is, the first information is only transmitted once.

It should be noted that at least one of the above-mentioned channel state threshold, channel congestion threshold, service QoS threshold, first proportion threshold, and second proportion threshold is configured by network configuration information or pre-configured information.

In the same way, the network configuration information is also used by the first terminal to determine that the first information is transmitted 1 or N times; for example, the network configuration information may include the configuration information of the above thresholds of the sidelink and the configuration information of the times of repeated transmission. In other words, the network configuration information may be the configuration information in step 201. Wherein, the configuration information of the above thresholds and the configuration information of the times of repeated transmission may be configured to the first terminal together in one information, or may be configured to the first terminal separately in different information.

In addition, the pre-configured information is also used by the first terminal to determine that the first information is transmitted 1 or N times. For example, the pre-configured information may include the configuration information of the above thresholds of the sidelink and the configuration information of the times of repeated transmission, that is, the pre-configured information may be the configuration information in step 201. Of course, the configuration information of the times of repeated transmission may not be included. When the network device is not configured with the times of repeated transmission, the first terminal may determine the first information transmitted N times according to the pre-configured information or the times of repeated transmission agreed by the protocol.

Further, in the case where the second terminals are a plurality of terminals, the sidelink state meeting a preset condition may refer to:

The sidelink service QoS is higher than the service QoS threshold; or

In the case that the sidelink service QoS is not higher than the service QoS threshold, the proportion of the sidelink channel congestion degree being lower than the channel congestion threshold is higher than the second proportion threshold.

That is, when the QoS is higher than the service QoS threshold, the sidelink channel congestion degree is not considered, but when the sidelink service QoS is not higher than the service QoS threshold, if the proportion of sidelink channel congestion degree being lower than the channel congestion threshold meets the above-mentioned preset conditions, it is determined to transmit for N times.

Among them, the sidelink service QoS being higher than the service QoS threshold, and the sidelink channel congestion degree being lower than the channel congestion threshold refer to related descriptions, for example: two service QoS thresholds can be configured.

Similarly, at least one of the channel congestion threshold, service QoS threshold, first proportion threshold, and second proportion threshold is configured by network configuration information or pre-configured information.

For example, the network configuration information may include channel congestion threshold, service QoS threshold, first proportion threshold, second proportion threshold, and configuration information of times of repeated transmission. That is, the network configuration information may be the configuration information in step 201. Wherein, the channel congestion threshold, service QoS threshold and configuration information of times of repeated transmission may be configured to the first terminal together in one information, or may be configured to the first terminal separately in different information.

For another example: the pre-configured information may include channel congestion threshold, service QoS threshold, first proportion threshold, second proportion threshold, and configuration information of times of repeated transmission, that is, the pre-configured information may be the configuration information in step 201. Of course, configuration information of times of repeated transmission may not be included. When the network device is not configured with the times of repeated transmission, the first terminal may determine the first information transmitted N times according to the pre-configured information or the times of repeated transmission agreed by the protocol.

Further, the first proportion threshold may include a first channel state proportion threshold and a second channel state proportion threshold, wherein the first channel state proportion threshold is greater than the second channel state proportion threshold. When it is determined that the first information is transmitted N times according to the configuration information, the value range of N is N6 and N7, and N7 is a positive integer greater than or equal to N6, and N6 is an integer greater than 1. In the case that the proportion of the sidelink channel state being lower than the channel state threshold is higher than the first channel state proportion threshold, the value of N is N7, and when the proportion of sidelink channel state being lower than the channel state threshold is higher than the second channel state proportion threshold and lower than the first channel state proportion threshold, the value of N is N6.

In this way, the higher the proportion of the sidelink channel state being lower than the channel state threshold is, the larger the times of repeated transmission of the first information is, so as to further improve the reception success rate.

Further, the second proportion threshold may include a first channel congestion proportion threshold and a second channel congestion proportion threshold, wherein the first channel congestion proportion threshold is greater than the second channel congestion proportion threshold; in the case where it is determined that the first information is transmitted N times according to the configuration information, the value range of N is N8 and N9, and N9 is a positive integer greater than or equal to N8, and N8 is an integer greater than 1. In the case that the proportion of the sidelink channel congestion degree being lower than the channel congestion threshold is higher than the first channel congestion proportion threshold, the value of N is N9, and the proportion of sidelink channel congestion degree being lower than the channel congestion threshold is higher than the second channel congestion proportion threshold and lower than the first channel congestion proportion threshold, the value of N is N8.

In this way, the higher the proportion of the sidelink channel congestion degree being lower than the channel congestion threshold is, the larger the times of repeated transmission of the first information is, so as to further improve the reception success rate.

It should be noted that in the case where the second terminals are a plurality of terminals, two service QoS thresholds can also be set. The above-mentioned related description may be referred for details, which will not be repeated here.

As an optional implementation, wherein a redundancy version (RV) number of each transmission of the first information among N times of transmission of the first information is the same or different; or the RV number of each transmission of the first information among N times of transmission of the first information is agreed by the protocol or configured by the network device or pre-configured.

Among them, the being agreed by the protocol or configured by the network device or pre-configured may refer to:

the version number agreed by the protocol being used for each transmission of the first information; or
the version number agreed by the protocol being circularly used for N times of repeated transmission; or
the version number used by HARQ retransmission being used for N times of repeated transmission; or
version numbers being circularly used for N times of repeated transmission according the order agreed by the protocol from the version number used by the HARQ retransmission.

As an optional implementation, the first terminal indicates to the second terminal the RV number of the currently transmitted information through SCI or sidelink RRC signaling, which can improve the probability that the second terminal receives the first terminal successfully.

In the embodiment of the present disclosure, the first terminal determines that the first information is transmitted 1 or N times according to the configuration information, where N is a positive integer greater than 1; if it is determined that the first information is transmitted N times, the first terminal transmits the first information for N times on the sidelink to the second terminal; if it is determined that the first information is transmitted once, the first terminal transmits the first information once to the second terminal on the sidelink. In this way, since the transmission of N times can be supported, the transmission reliability of the sidelink can be improved.

Figure 3:
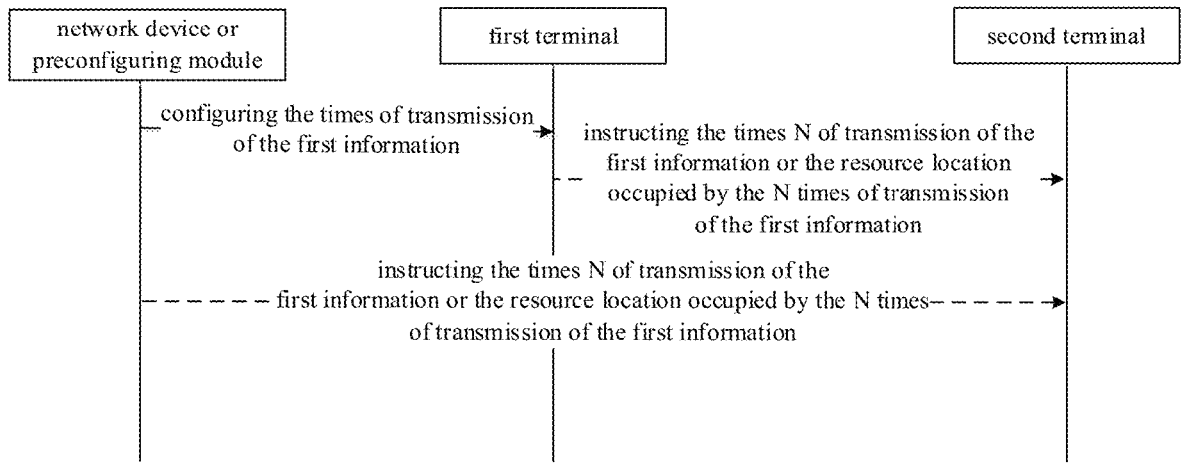
FIG. 3 is another flow chart of a sidelink transmission method according to one embodiment of the present disclosure.

The following embodiments take the NR sidelink system as an example for description. The specific implementation example is as follows:

Embodiment 1: The Times of Transmission of the First Information Configured by the Network Device or Pre-Configured The specific signaling flow chart is shown in FIG. 3:

Among them, the times of transmission is 1 or N, where N is a positive integer greater than 1. When the times of transmission is 1, it means that the first information is only transmitted once, that is, repeated transmission is not enabled; when the times of transmission is N, except for the initial transmission of 1 times, the repeated transmission is implemented for (N−1) times.

The configuration information configured by the network device may be configured through broadcast message SIB, or configured through UE-specific RRC signaling;

The pre-configured information may be a pre-configured times of repeated transmission of the first terminal, or the times of repeated transmission predefined in the protocol.

Optionally, the first terminal or the network device instructs the second terminal the times N of transmission of the first information or the resource location occupied by the N times of transmission of the first information;

Wherein, the first terminal may indicate the second terminal the times N of transmission of the first information or the resource location occupied by N times of transmission of the first information through the SCI, so that the second terminal can receive the first information;

The network device may indicate the second terminal the times N of transmission of the first information or the resource location occupied by N times of transmission of the first information through a broadcast message SIB or through UE-specific RRC signaling, so that the second terminal receives the first information, where the times of transmission of the first information configured to the first terminal and the times of transmission of the first information indicated to the second terminal are configured to the first terminal and the second terminal together in one information, such as SIB broadcast message, may also be configured to the first terminal and the second terminal in different information.

Embodiment 2: Enable or Disable HARQ Feedback in Sidelink Transmission

The specific flow chart can also be seen in FIG. 3.

Figure 4:
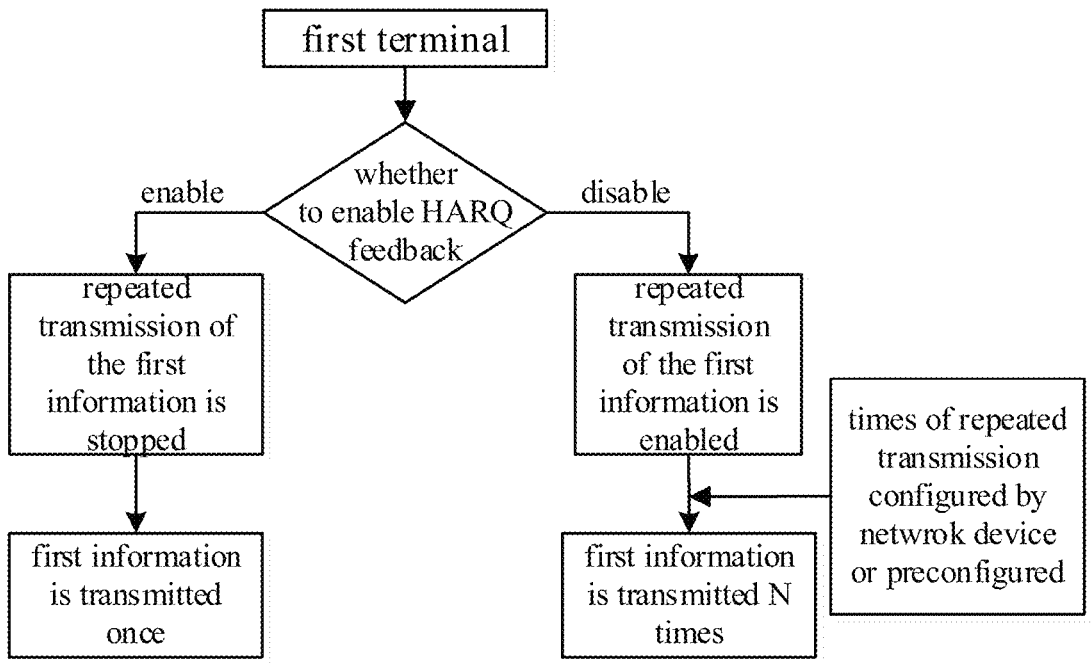
FIG. 4 is yet another flow chart of a sidelink transmission method according to one embodiment of the present disclosure.

In addition, as shown in FIG. 4, when the first terminal enables HARQ feedback in the sidelink transmission, retransmission of the first information is stopped, that is, the first information is only transmitted once;

When the first terminal disables the HARQ feedback during the sidelink transmission, the repeated transmission of the first information is enabled, and the times of transmission of the first information is determined to be 1 or N according to the times of repeated transmission configured by the network device or the pre-configured, which can improve the receive success rate.

The first terminal may enable or disable the HARQ feedback according to network configuration information, pre-configured information, channel state, service characteristics or service QoS, etc. The specific solution is not limited in the embodiment of the present disclosure.

The network configuration information may include configuration information of the times of repeated transmission, which may be configured through broadcast message SIB or configured through terminal-specific RRC signaling.

The pre-configured information may include the configuration information of the times of repeated transmission pre-configured or pre-defined by the protocol, that is, the configuration information of the times of repeated transmission may not be configured. When the network device is not configured with the times of repeated transmission, the first terminal determines that the times of transmission of the first information is 1 or N times according to the pre-configured information, or the times of repeated transmission pre-defined by the protocol.

Optionally, the first terminal or the network device instructs the second terminal the times N of transmission of the first information or the resource location occupied by the N times of transmission of the first information;

The first terminal indicates the second terminal the times N of transmission of the first information or the resource location occupied by the N times of transmission of the first information through the sidelink control information SCI, so that the second terminal can receive the first information;

The network device may indicate the second terminal the times N of transmission of the first information or the resource location occupied by the N times of transmission of the first information through a broadcast message SIB or through terminal-specific RRC signaling, so that the second terminal receives the first information, where the times of repeated transmission of the first information configured for the first terminal and the times of repeated transmission of the first information indicated to the second terminal may be configured to the first terminal and the second terminal together in one information, such as SIB broadcast message, may also be configured to the first terminal and the second terminal in different information, such as an RRC message.

Embodiment 3: Sidelink Channel State

Figure 5:
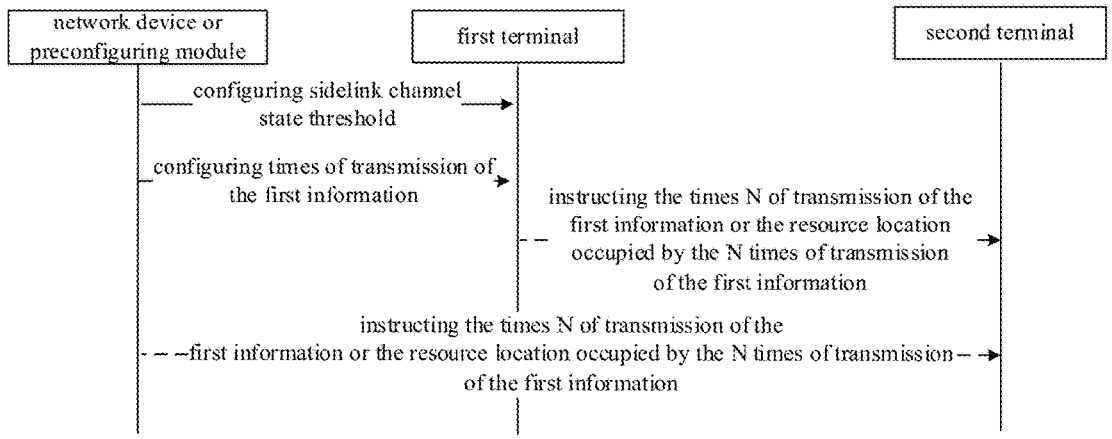
FIG. 5 is still yet another flow chart of a sidelink transmission method according to one embodiment of the present disclosure.

The specific flow chart is shown in FIG. 5.

The network device configures or pre-configures the channel state threshold of the sidelink, such as CSI threshold, RI threshold, CQI threshold, SINR threshold or RSRP threshold.

If the sidelink channel state (CSI, CQI or RSRP) is higher than the corresponding threshold, it indicates that the channel state is good, repeated transmission of the first information is stopped, that is, the first information is only transmitted once;

If the sidelink channel state (CSI, CQI, or RSRP) is lower than the threshold, it indicates that the channel state is poor, repeated transmission of the first information is enabled, and it is determined that the first information is transmitted N times according to the configuration information, thereby improving the reception success rate;

A plurality of channel state thresholds may be configured, such as threshold 1 and threshold 2, wherein threshold 1 is greater than threshold 2. When the sidelink channel state (CSI, CQI or RSRP) is lower than threshold 1 and higher than threshold 2, the repeated transmission of the first information is enabled, the times of transmission of the first information is N1; when the sidelink channel state (CSI, CQI, or RSRP) is lower than the threshold 2, the times of repeated transmission of the first information is N2, where N2 is greater than or equal to N1, N1 and N2 are both configured by network or pre-configured.

The network configuration information including configuration information of sidelink channel state threshold and configuration information of the times of repeated transmission can be configured through broadcast message SIB, or configured through terminal-specific RRC signaling, the configuration information of sidelink channel state threshold and the configuration information of the times of repeated transmission may be configured to the first terminal together in one information, or may be configured to the first terminal separately in different information;

The pre-configured information may include the configuration information of sidelink channel state threshold and the configuration information of the times of repeated transmission, which are pre-configured or pre-defined by the protocol; of course, the configuration information of the times of repeated transmission may not be configured. When the network device is not configured with the times of repeated transmission, the first terminal determines to transmit the first information N times according to the pre-configured information or the times of repeated transmission predefined in the protocol.

Optionally, the first terminal or the network device instructs the second terminal the times N of transmission of the first information or the resource location occupied by the N times of transmission of the first information;

The first terminal can indicate the second terminal the times of transmission N of the first information or the resource location occupied by N times of transmission of the first information through the SCI, so that the second terminal can receive the first information; the network device can indicate the second terminal the times of transmission N of the first information or the resource location occupied by N times of transmission of the first information through broadcast message SIB, or terminal-specific RRC signaling, so that the second terminal can receive the first information; Wherein, the times of repeated transmission of the first information configured to the first terminal and the times of repeated transmission of the first information indicated to the second terminal may be configured to the first terminal and the second terminal together in one information, such as SIB broadcast messages, of course, it may also be configured to the first terminal and the second terminal in different information, such as an RRC message.

Embodiment 4: Channel Congestion Condition of the Sidelink

Figure 6:
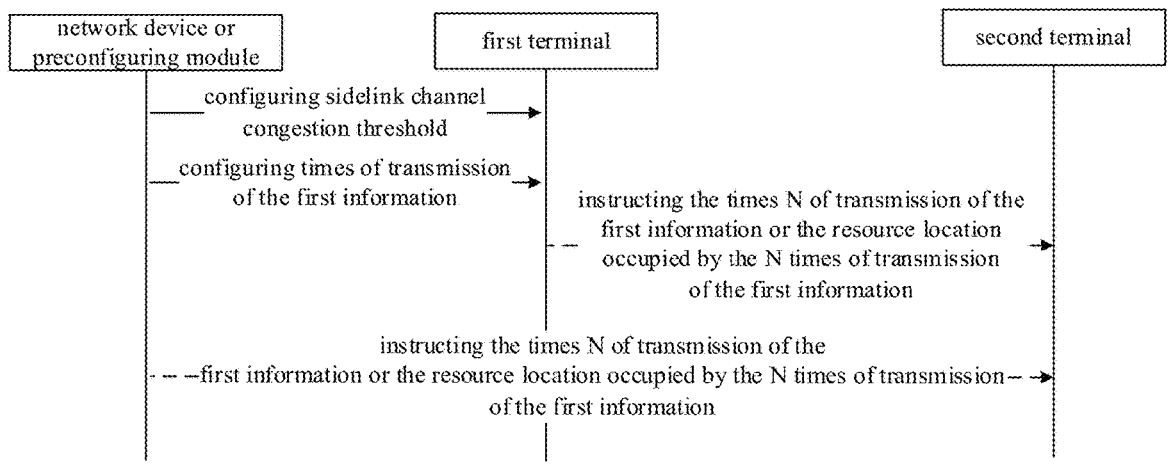
FIG. 6 is still yet another flow chart of a sidelink transmission method according to one embodiment of the present disclosure.

The specific flow chart is shown in FIG. 6.

The network device configures or pre-configures the sidelink channel congestion threshold, such as the CBR threshold or the CR threshold.

If the sidelink channel congestion degree is higher than the corresponding threshold, it indicates that the channel is congested, the repeated transmission of the first information is stopped, that is, the first information is only transmitted once; since the channel is already congested, there are not many resources available, so as to avoid occupying more transmission resources, and avoid the possibility that transmission resources cannot be selected or conflict with other terminals for sending information;

If the sidelink channel congestion degree is lower than the corresponding threshold, it indicates that the channel is not congested, that is, the channel resources are relatively abundant, the repeated transmission of the first information is enabled, and it is determined that the first information is transmitted N times according to the times of repeated transmission which is configured by the network device or preconfigured, so as to improve the reception success rate;

It is also possible to configure a plurality of channel congestion thresholds, such as threshold 1 and threshold 2, where threshold 1 is greater than threshold 2. When the sidelink channel congestion CBR or CR is lower than threshold 1 and higher than threshold 2, the repeated transmission of the first information is enabled, the times of transmission of the first information is N3; when the sidelink channel congestion CBR or CR is lower than the threshold 2, the times of repeated transmission of the first information is N4, where N4 is greater than or equal to N3, and N3 and N4 are both configured by network or pre-configured.

For the network configuration information and pre-configured information, as well as the indication N and resource location may refer to the corresponding description of the above embodiment, which will not be repeated here.

Embodiment 5: Service QoS of the First Terminal on the Sidelink

Figure 7:
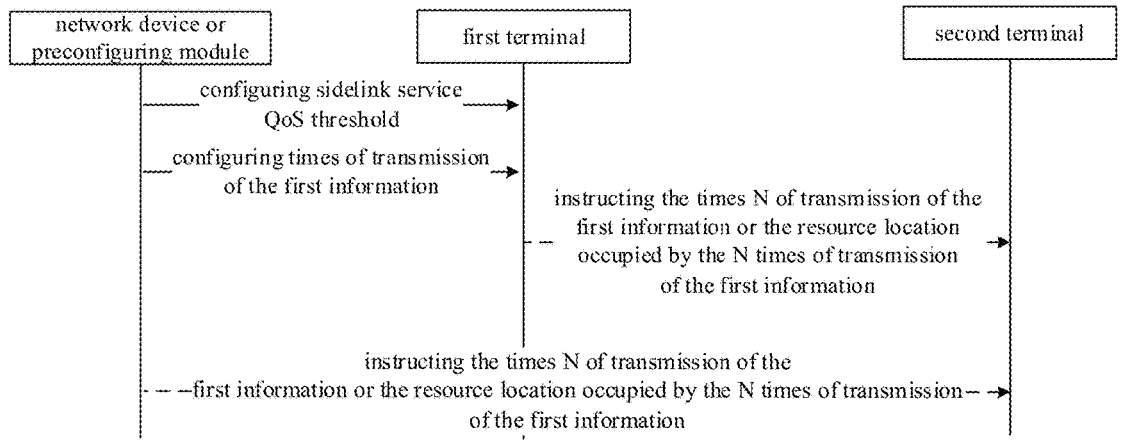
FIG. 7 is still yet another flow chart of a sidelink transmission method according to one embodiment of the present disclosure.

The specific flow chart is shown in FIG. 7.

The sidelink service QoS threshold such as a reliability threshold, a delay threshold, a priority threshold, or a communication range threshold is configured by the network device or pre-configured.

For the sidelink service QoS, if the reliability is higher than the reliability threshold, it indicates that the service requires a higher reliability, or the delay is higher than the delay threshold, it indicates that the service requires a higher delay, or if the priority is higher than the priority threshold, it indicates that the service requires a higher priority, or if the communication range is higher than the communication range threshold, it indicates that the service requires a long communication range, and multiple times of transmission is required to reach the transmission distance, and then the repeated transmission of the first information is enabled, it is determined that the first information is transmitted N times according to the configuration information, thereby improving the reception success rate, avoiding retransmissions, and reducing transmission delay.

For the sidelink service QoS, for example, if the reliability is lower than the reliability threshold, it indicates the reliability required by the service is not high, or if the delay is lower than the delay threshold, it indicates that the service requires a low delay, or if the communication range is lower than the communication range threshold, it indicates that the communication range required by the service is relatively short, and the transmission distance can be reached in 1 times of transmission, the repeated transmission of the first information is stopped, that is, the first information is only transmitted once, thereby reducing transmission overhead.

A plurality of QoS thresholds may be configured, such as threshold 1 and threshold 2, wherein threshold 1 is greater than threshold 2. When the service QoS is higher than threshold 2 and lower than threshold 1, repeated transmission of the first information is enabled, and the times of transmission of the first information is N5. When the service QoS is higher than the threshold 2, the times of repeated transmission of the first information is N6, wherein N6 is greater than or equal to N5, and both N6 and N5 are configured by network or pre-configured.

For the above-mentioned network configuration information and pre-configured information, as well as the indication N and resource location may refer to the corresponding description of the above embodiment, which will not be repeated here.

Figure 8:
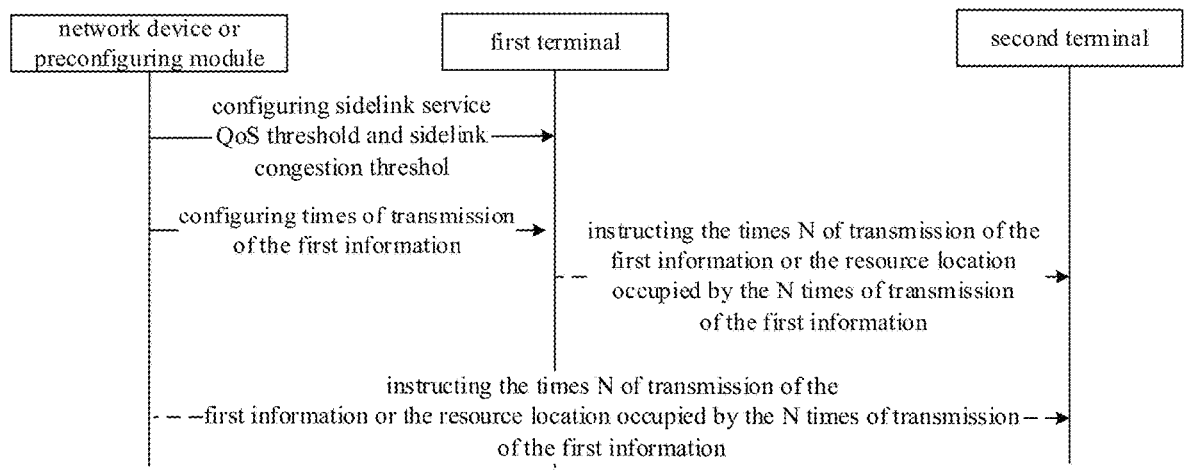
FIG. 8 is still yet another flow chart of a sidelink transmission method according to one embodiment of the present disclosure.

Embodiment 6: Service QoS and Channel Congestion Condition of the First Terminal on the Sidelink The specific flow chart is shown in FIG. 8.

The sidelink service QoS threshold and channel congestion threshold are configured by the network device or pre-configured, for example, service QoS thresholds can be the reliability threshold, the delay threshold, the priority threshold, and the communication range threshold, the channel congestion threshold can be the CBR threshold or CR threshold.

For the sidelink service QoS, if the reliability is higher than the reliability threshold, it indicates that the service requires a higher reliability, or the delay is higher than the delay threshold, it indicates that the service requires a higher delay, or if the priority is higher than the priority threshold, it indicates that the service requires a higher priority, or if the communication range is higher than the communication range threshold, it indicates that the service requires a long communication range, and multiple times of transmission is required to reach the transmission distance, and then the repeated transmission of the first information is enabled, it is determined that the first information is transmitted N times according to the configuration information, thereby improving the reception success rate, avoiding retransmissions, and reducing transmission delay.

A plurality of QoS thresholds may be configured, such as threshold 1 and threshold 2, wherein threshold 1 is greater than threshold 2. When the service QoS is higher than threshold 2 and lower than threshold 1, repeated transmission of the first information is enabled, and the times of transmission of the first information is N5. When the service QoS is higher than the threshold 2, the times of repeated transmission of the first information is N6, wherein N6 is greater than or equal to N5, and both N6 and N5 are configured by network or pre-configured.

For the sidelink service QoS, for example, if the reliability is lower than the reliability threshold, it indicates the reliability required by the service is not high, or if the delay is lower than the delay threshold, it indicates that the service requires a low delay, or if the communication range is lower than the communication range threshold, it indicates that the communication range required by the service is relatively short, and the transmission distance can be reached in 1 times of transmission, the repeated transmission of the first information is stopped, that is, the first information is only transmitted once, thereby reducing transmission overhead.

If the sidelink channel congestion degree is higher than the corresponding threshold, it indicates that the channel is relatively congested, the repeated transmission of the first information is stopped, that is, the first information is only transmitted once;

If the sidelink channel congestion degree is lower than the corresponding threshold, it indicates that the channel is not congested, that is, the channel resources are relatively abundant, and then the repeated transmission of the first information is enabled, and the first information is determined transmitted N times according to the configuration information.

The network configuration information and pre-configured information, as well as the indication N and resource location may refer to the corresponding description of the above embodiment, which will not be repeated here.

The method provided by the embodiment of the present disclosure can realize that, the first terminal determines to transmit the first information 1 time or N times according to the configuration information of the network device or pre-configured information; the first terminal transmits the first information N times to the second terminal on the sidelink, where N is a positive integer greater than 1; optionally, the first terminal or network device instructs the second terminal the times N of transmission of the first information or the resource location occupied by N times of transmission of the first information.

Further, the first terminal determines to transmit the first information 1 or N times according to the configuration information of the network device or pre-configured information, and the sidelink channel state and/or the sidelink service information, where N is a positive integer greater than 1.

The method provided by the embodiments of the present disclosure can improve the reliability of information transmission on the sidelink and reduce the service transmission delay.

Figure 9:
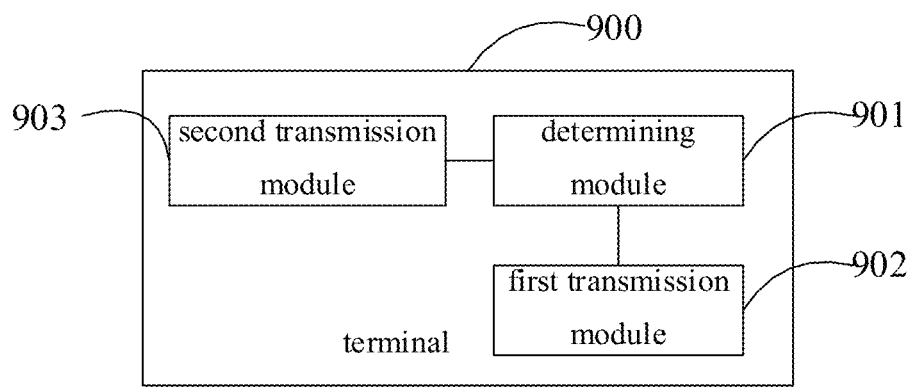
FIG. 9 is a block diagram showing a terminal according to one embodiment of the present disclosure.

FIG. 9 is a structural diagram of a terminal provided by an embodiment of the present disclosure. The terminal is the first terminal. As shown in FIG. 9, the terminal 900 includes: a determining module 901, configured to determine that first information is transmitted 1 or N times according to configuration information, where N is a positive integer greater than 1; a first transmission module 902, configured to, if it is determined that the first information is transmitted N times, transmit the first information to a second terminal N times on the sidelink; a second transmission module 902, configured to, if it is determined that the first information is transmitted once, transmit the first information to the second terminal once on the sidelink.

Optionally, the configuration information is network configuration information or pre-configured information.

Optionally, the network configuration information is configuration information sent by the network device through a broadcast message or RRC signaling; and the pre-configured information is information configured by the network device or the first terminal in advance for the first terminal, or, the pre-configured information is information agreed by a protocol.

Optionally, when the first terminal determines that the first information is transmitted N times, the first terminal or the network device indicates to the second terminal at least one of the following: a value of N; or a resource location occupied by N times of transmission of the first information.

Optionally, the first terminal instructs through sidelink control information SCI or sidelink RRC signaling; or the network device instructs through a broadcast message or RRC signaling.

Optionally, the broadcast message is also used by the first terminal to determine that the first information is transmitted 1 or N times.

Optionally, when the first terminal enables HARQ feedback, during one transmission process, the first information is only transmitted once; and/or when the first terminal disables HARQ feedback, the first terminal determines, according to the configuration information, that the first information is transmitted 1 or N times.

Optionally, the first terminal determines to enable or disable HARQ feedback according to at least one of the following: network configuration information, pre-configured information, a channel state, service characteristics and service QoS.

Optionally, in the case that the link information of the sidelink meets a preset condition, the first terminal determines that the first information is transmitted N times according to the configuration information; and/or in the case that the link information of the sidelink does not meet the preset condition, the first information is only transmitted once during one transmission; wherein the link information includes the link state and/or the link service information.

Optionally, in the case where the second terminal is one terminal, the link information of the above-mentioned sidelink meeting the preset condition may be at least one of the following:

The channel state of the sidelink being lower than the channel state threshold;

The sidelink channel congestion level being lower than the channel congestion threshold;

The service quality QoS of the sidelink service is higher than the service QoS threshold.

or,

In a case where the second terminals are a plurality of terminals, the sidelink information meeting a preset condition refers to at least one of the following:

a proportion of the sidelink channel state being lower than the channel state threshold is higher than a first proportion threshold;

a proportion of the sidelink channel congestion degree being lower than the channel congestion threshold is higher than a second proportion threshold; or the sidelink service QoS is higher than the service QoS threshold.

Optionally, the QoS includes at least one of the following: reliability, delay, priority or a communication range.

Optionally, when the second terminal is one terminal, the link information of the sidelink meeting a preset condition refers to:

The sidelink service QoS being higher than the service QoS threshold; or

In the case that the sidelink service QoS is not higher than the service QoS threshold, the sidelink channel congestion degree being lower than the channel congestion threshold;

or,

In the case that the second terminal is a plurality of terminals, the link information of the sidelink mets a preset condition refers to:

The sidelink service QoS being higher than the service QoS threshold; or

In the case that the sidelink service QoS is not higher than the service QoS threshold, the proportion of the sidelink channel congestion degree being lower than the channel congestion threshold is higher than the second proportion threshold.

Optionally, the channel state threshold may include a first channel state threshold and a second channel state threshold, wherein the first channel state threshold is greater than the second channel state threshold. In the case that it is determined that the first information is to transmitted N times according to the configuration information, the value range of N is N1 and N2, and N2 is a positive integer greater than or equal to N1, and N1 is an integer greater than 1, in the case that the sidelink channel state is lower than the second channel state threshold, the value of N is N2, and in the case that the sidelink channel state is lower than the first channel state threshold and higher than the second channel state threshold, the value of N is N1; or the channel congestion threshold may include a first channel congestion threshold and a second channel congestion threshold, where the first channel congestion threshold is greater than the second channel congestion threshold; and when it is determined that the first information is transmitted N times according to the configuration information, the value range of N is N3 and N4, and N4 is a positive integer greater than or equal to N3, and N3 is an integer greater than 1. When the sidelink channel congestion degree is lower than the second channel congestion threshold, the value of N is N4, and when the sidelink channel congestion degree is lower than the first channel congestion threshold and higher than the second channel congestion threshold, the value of N is N3; or The service QoS threshold may include a first service QoS threshold and a second service QoS threshold, where the first service QoS threshold is greater than the second service QoS threshold; and when it is determined that the first information is transmitted N times according to the configuration information, the value range of N is N5 and N6, and N6 is a positive integer greater than or equal to N5, and N5 is an integer greater than 1. When the sidelink service QoS is higher than the first service QoS threshold, the value of N is N6, and the sidelink service QoS is higher than the first service QoS threshold and lower than the second service QoS threshold, the value of N is N5; or The first proportion threshold may include a first channel state proportion threshold and a second channel state proportion threshold, wherein the first channel state proportion threshold is greater than the second channel state proportion threshold. When it is determined that the first information is transmitted N times according to the configuration information, the value range of N is N6 and N7, and N7 is a positive integer greater than or equal to N6, and N6 is an integer greater than 1. In the case that the proportion of the sidelink channel state being lower than the channel state threshold is higher than the first channel state proportion threshold, the value of N is N7, and when the proportion of sidelink channel state being lower than the channel state threshold is higher than the second channel state proportion threshold and lower than the first channel state proportion threshold, the value of N is N6; or The second proportion threshold may include a first channel congestion proportion threshold and a second channel congestion proportion threshold, wherein the first channel congestion proportion threshold is greater than the second channel congestion proportion threshold; in the case where it is determined that the first information is transmitted N times according to the configuration information, the value range of N is N8 and N9, and N9 is a positive integer greater than or equal to N8, and N8 is an integer greater than 1. In the case that the proportion of the sidelink channel congestion degree being lower than the channel congestion threshold is higher than the first channel congestion proportion threshold, the value of N is N9, and the proportion of sidelink channel congestion degree being lower than the channel congestion threshold is higher than the second channel congestion proportion threshold and lower than the first channel congestion proportion threshold, the value of N is N8.

Optionally, at least one of the channel state threshold, the channel congestion threshold, the service QoS threshold, the first proportion threshold, and the second proportion threshold is configured by network configuration information or pre-configured information.

Optionally, the network configuration information is also used by the first terminal to determine that the first information is transmitted 1 or N times; or The pre-configured information is also used by the first terminal to determine that the first information is transmitted 1 or N times.

Optionally, the redundancy version (RV) number of each transmission of the first information among N times of transmission of the first information is the same or different; or the RV number of each transmission of the first information among N times of transmission of the first information is agreed by the protocol or configured by the network device or pre-configured.

Optionally, the first terminal indicates the RV number of the currently transmitted information to the second terminal through SCI or sidelink RRC signaling.

The first terminal provided in the embodiment of the present disclosure can implement each step in the method shown in FIG. 2 and can achieve the same beneficial effects. To avoid repetition, details are not repeated here.

Figure 10:
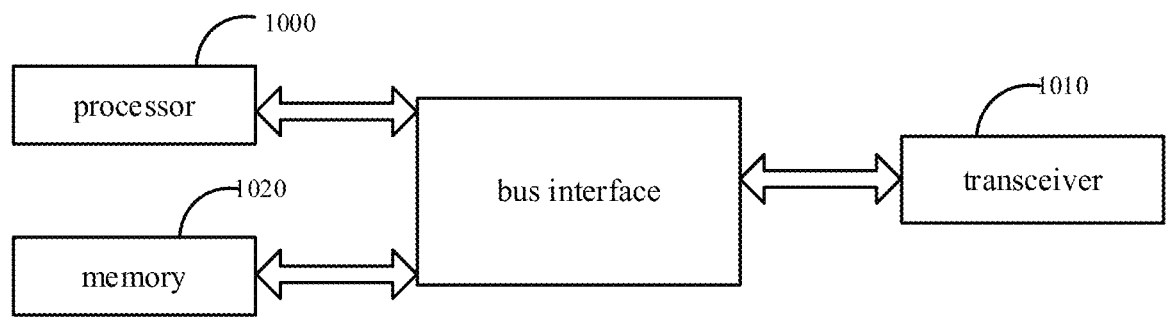
FIG. 10 is another block diagram showing a terminal according to one embodiment of the present disclosure.

FIG. 10 is a structural diagram of another first terminal provided by an embodiment of the present disclosure. As shown in FIG. 10, the first terminal includes: a transceiver 1010, a memory 1020, a processor 1000, and a program stored on the memory 1020 and executed by the processor 1000, wherein:

The processor 1000 is configured to determine that first information is transmitted 1 or N times according to configuration information, where N is a positive integer greater than 1;

The transceiver 1010 is configured to, if it is determined that the first information is transmitted N times, transmit the first information to a second terminal N times on the sidelink;

The transceiver 1010 is further configured to, if it is determined that the first information is transmitted once, transmit the first information to the second terminal once on the sidelink;

or,

The transceiver 1010 is configured to determine that first information is transmitted 1 or N times according to configuration information, where N is a positive integer greater than 1;

The transceiver 1010 is configured to, if it is determined that the first information is transmitted N times, transmit the first information to a second terminal N times on the sidelink;

The transceiver 1010 is further configured to, if it is determined that the first information is transmitted once, transmit the first information to the second terminal once on the sidelink;

The transceiver 1010 can be used to receive and send data under the control of the processor 1000.

In FIG. 10, the bus architecture may include any number of interconnected buses and bridges. Specifically, various circuits of one or more processors represented by the processor 1000 and the memory represented by the memory 1020 are linked together. The bus architecture can also link various other circuits such as peripheral devices, voltage regulators, power management circuits, etc., which are all known in the art, and therefore, no further description will be given herein. The bus interface provides the interface. The transceiver 1010 may be a plurality of elements, including a transmitter and a receiver, and provide a unit for communicating with various other devices on the transmission medium.

The processor 1000 is responsible for managing the bus architecture and general processing, and the memory 1020 can store data used by the processor 1000 when performing operations.

It should be noted that the memory 1020 is not limited to being only on the first terminal, and the memory 1020 and the processor 1000 may be separated in different geographic locations.

Optionally, the configuration information is network configuration information or pre-configured information.

Optionally, the network configuration information is configuration information sent by the network device through a broadcast message or RRC signaling; and the pre-configured information is information configured by the network device or the first terminal in advance for the first terminal, or, the pre-configured information is information agreed by a protocol.

Optionally, when the first terminal determines that the first information is transmitted N times, the first terminal or the network device indicates to the second terminal at least one of the following: a value of N; or a resource location occupied by N times of transmission of the first information.

Optionally, the first terminal instructs through sidelink control information SCI or sidelink RRC signaling; or the network device instructs through a broadcast message or RRC signaling.

Optionally, the broadcast message is also used by the first terminal to determine that the first information is transmitted 1 or N times.

Optionally, when the first terminal enables HARQ feedback, during one transmission process, the first information is only transmitted once; and/or when the first terminal disables HARQ feedback, the first terminal determines, according to the configuration information, that the first information is transmitted 1 or N times.

Optionally, the first terminal determines to enable or disable HARQ feedback according to at least one of the following: network configuration information, pre-configured information, a channel state, service characteristics and service QoS.

Optionally, in the case that the link information of the sidelink meets a preset condition, the first terminal determines that the first information is transmitted N times according to the configuration information; and/or in the case that the link information of the sidelink does not meet the preset condition, the first information is only transmitted once during one transmission; wherein the link information includes the link state and/or the link service information.

Optionally, in the case where the second terminal is one terminal, the link information of the above-mentioned sidelink meeting the preset condition may be at least one of the following:

The channel state of the sidelink being lower than the channel state threshold;

The sidelink channel congestion level being lower than the channel congestion threshold;

The service quality QoS of the sidelink service is higher than the service QoS threshold.

or,

In a case where the second terminals are a plurality of terminals, the sidelink information meeting a preset condition refers to at least one of the following:

a proportion of the sidelink channel state being lower than the channel state threshold is higher than a first proportion threshold;

a proportion of the sidelink channel congestion degree being lower than the channel congestion threshold is higher than a second proportion threshold; or the sidelink service QoS is higher than the service QoS threshold.

Optionally, the QoS includes at least one of the following: reliability, delay, priority or a communication range.

Optionally, when the second terminal is one terminal, the link information of the sidelink meeting a preset condition refers to:

The sidelink service QoS being higher than the service QoS threshold; or

In the case that the sidelink service QoS is not higher than the service QoS threshold, the sidelink channel congestion degree being lower than the channel congestion threshold;

or,

In the case that the second terminal is a plurality of terminals, the link information of the sidelink mets a preset condition refers to:

The sidelink service QoS being higher than the service QoS threshold; or

In the case that the sidelink service QoS is not higher than the service QoS threshold, the proportion of the sidelink channel congestion degree being lower than the channel congestion threshold is higher than the second proportion threshold.

Optionally, the channel state threshold may include a first channel state threshold and a second channel state threshold, wherein the first channel state threshold is greater than the second channel state threshold. In the case that it is determined that the first information is to transmitted N times according to the configuration information, the value range of N is N1 and N2, and N2 is a positive integer greater than or equal to N1, and N1 is an integer greater than 1, in the case that the sidelink channel state is lower than the second channel state threshold, the value of N is N2, and in the case that the sidelink channel state is lower than the first channel state threshold and higher than the second channel state threshold, the value of N is N1; or the channel congestion threshold may include a first channel congestion threshold and a second channel congestion threshold, where the first channel congestion threshold is greater than the second channel congestion threshold; and when it is determined that the first information is transmitted N times according to the configuration information, the value range of N is N3 and N4, and N4 is a positive integer greater than or equal to N3, and N3 is an integer greater than 1. When the sidelink channel congestion degree is lower than the second channel congestion threshold, the value of N is N4, and when the sidelink channel congestion degree is lower than the first channel congestion threshold and higher than the second channel congestion threshold, the value of N is N3; or The service QoS threshold may include a first service QoS threshold and a second service QoS threshold, where the first service QoS threshold is greater than the second service QoS threshold; and when it is determined that the first information is transmitted N times according to the configuration information, the value range of N is N5 and N6, and N6 is a positive integer greater than or equal to N5, and N5 is an integer greater than 1. When the sidelink service QoS is higher than the first service QoS threshold, the value of N is N6, and the sidelink service QoS is higher than the first service QoS threshold and lower than the second service QoS threshold, the value of N is N5; or The first proportion threshold may include a first channel state proportion threshold and a second channel state proportion threshold, wherein the first channel state proportion threshold is greater than the second channel state proportion threshold. When it is determined that the first information is transmitted N times according to the configuration information, the value range of N is N6 and N7, and N7 is a positive integer greater than or equal to N6, and N6 is an integer greater than 1. In the case that the proportion of the sidelink channel state being lower than the channel state threshold is higher than the first channel state proportion threshold, the value of N is N7, and when the proportion of sidelink channel state being lower than the channel state threshold is higher than the second channel state proportion threshold and lower than the first channel state proportion threshold, the value of N is N6; or The second proportion threshold may include a first channel congestion proportion threshold and a second channel congestion proportion threshold, wherein the first channel congestion proportion threshold is greater than the second channel congestion proportion threshold; in the case where it is determined that the first information is transmitted N times according to the configuration information, the value range of N is N8 and N9, and N9 is a positive integer greater than or equal to N8, and N8 is an integer greater than 1. In the case that the proportion of the sidelink channel congestion degree being lower than the channel congestion threshold is higher than the first channel congestion proportion threshold, the value of N is N9, and the proportion of sidelink channel congestion degree being lower than the channel congestion threshold is higher than the second channel congestion proportion threshold and lower than the first channel congestion proportion threshold, the value of N is N8.

Optionally, at least one of the channel state threshold, the channel congestion threshold, the service QoS threshold, the first proportion threshold, and the second proportion threshold is configured by network configuration information or pre-configured information.

Optionally, the network configuration information is also used by the first terminal to determine that the first information is transmitted 1 or N times; or The pre-configured information is also used by the first terminal to determine that the first information is transmitted 1 or N times.

Optionally, a redundancy version (RV) number of each transmission of the first information among N times of transmission of the first information is the same or different; or the RV number of each transmission of the first information among N times of transmission of the first information is agreed by the protocol or configured by the network device or pre-configured.

Optionally, the first terminal indicates the RV version number of the currently transmitted information to the second terminal through SCI or sidelink RRC signaling.

It should be noted that the above-mentioned first terminal in this embodiment may be the first terminal of any implementation in the method in the embodiment of the present disclosure, and any implementation of the first terminal in the method in the embodiment of the disclosure may be implemented by the above-mentioned first terminal in this embodiment and achieves the same beneficial effects, and details are not described herein again.

The implementation of the present disclosure also provides a computer-readable storage medium on which a computer program is stored. When the program is executed by a processor, the steps in the sidelink transmission method provided in the embodiments of the present disclosure are implemented.

A person of ordinary skill in the art may be aware that the units and algorithm steps of the examples described in combination with the embodiments can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present disclosure.

Those skilled in the art can clearly understand that, for the convenience and conciseness of description, the specific working process of the above-described system, device, and unit can refer to the corresponding process in the foregoing method embodiment, which is not repeated here.

In the several embodiments provided in the present disclosure, it should be understood that the method and device can be implemented in other ways. For example, the device embodiments described above are only illustrative. For example, the division of the units is only a logical function division, and there may be other divisions in actual implementation, for example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may be separately physically included, or two or more units may be integrated into one unit. The above-mentioned integrated unit may be implemented in the form of hardware, or may be implemented in the form of hardware and software functional units.

The above-mentioned integrated unit implemented in the form of a software functional unit may be stored in a computer readable storage medium. The above-mentioned software functional unit is stored in a storage medium and includes several instructions to make a computer device (which may be a personal computer, a server, or a network device, etc.) execute steps of the sidelink transmission method described in the embodiment of the present disclosure. The aforementioned storage media include: U disk, mobile hard disk, read-only memory (ROM), random access memory (RAM), magnetic disk or optical disk and other media that can store program code.

If the function is implemented in the form of a software functional unit and sold or used as an independent product, it can be stored in a computer readable storage medium. Based on this understanding, the technical solution of the present disclosure essentially or the part that contributes to the related art can be embodied in the form of a software product. The computer software product is stored in a storage medium and includes several instructions to make a computer device (which may be a personal computer, a server, or a network device, etc.) executes all or part of the steps of the methods described in the various embodiments of the present disclosure. The aforementioned storage medium include: U disk, mobile hard disk, ROM, RAM, magnetic disk or optical disk and other media that can store program codes.

A person of ordinary skill in the art can understand that all or part of the processes in the above-mentioned embodiment methods can be implemented by controlling the relevant hardware through a computer program. The program can be stored in a computer readable storage medium. When executed, the program may include the procedures of the above-mentioned method embodiments. Wherein, the storage medium may be a magnetic disk, an optical disc, a read-only memory (Read-Only Memory, ROM), or a random access memory (Random Access Memory, RAM), etc.

It can be understood that the embodiments described in the present disclosure can be implemented by hardware, software, firmware, middleware, microcode, or a combination thereof. For hardware implementation, modules, units, and sub-units can be implemented in one or more Application Specific Integrated Circuits (ASIC), Digital Signal Processor (DSP), and Digital Signal Processing Equipment (DSP Device, DSPD)), Programmable Logic Device (PLD), Field-Programmable Gate Array (FPGA), general-purpose processors, controllers, microcontrollers, microprocessors, other electronic units used to implement functions of the present disclosure or combinations thereof.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The above are optional implementations of the present disclosure. It should be pointed out that for those of ordinary skill in the art, several improvements and modifications can be made without departing from the principles of the present disclosure. These improvements and modifications should also be regarded as the protection scope of the present disclosure.

What is claimed is:

1. A sidelink transmission method, comprising:
   determining, by a first terminal, that first information is transmitted 1 or N times according to configuration information, wherein N is a positive integer greater than 1;
   if it is determined that the first information is transmitted N times, transmitting, by the first terminal, the first information to a second terminal N times on a sidelink;
   if it is determined that the first information is transmitted once, transmitting, by the first terminal, the first information to the second terminal once on the sidelink;
   wherein in the case that link information of the sidelink meets a preset condition, the first terminal determines that the first information is transmitted N times according to the configuration information;
   in the case that the link information of the sidelink does not meet the preset condition, the first information is only transmitted once during one transmission process;
   wherein the link information includes a link state and/or link service information;
   wherein in the case that the second terminal is one terminal, the link information of the sidelink meeting the preset condition refers to at least one of the following:
   a sidelink channel state is lower than a channel state threshold;
   a sidelink channel congestion degree is lower than a channel congestion threshold;
   sidelink service QoS is higher than a service QoS threshold;
   or
   in a case where the second terminal is a plurality of terminals, the link information of the sidelink meeting the preset condition refers to at least one of the following:
   a proportion of the sidelink channel state being lower than the channel state threshold is higher than a first proportion threshold;
   a proportion of the sidelink channel congestion degree being lower than the channel congestion threshold is higher than a second proportion threshold; or
   the sidelink QoS is higher than the service QoS threshold;
   wherein the channel state threshold includes a first channel state threshold and a second channel state threshold, the first channel state threshold is greater than the second channel state threshold; in the case that it is determined that the first information is transmitted N times according to the configuration information, a value range of N is N1 and N2, and N2 is a positive integer greater than or equal to N1, and N1 is an integer greater than 1, in the case that the sidelink channel state is lower than the second channel state threshold, a value of N is N2, and in the case that the sidelink channel state is lower than the first channel state threshold and higher than the second channel state threshold, the value of N is N1; or
   the channel congestion threshold includes a first channel congestion threshold and a second channel congestion threshold, wherein the first channel congestion threshold is greater than the second channel congestion threshold; and when it is determined that the first information is transmitted N times according to the configuration information, a value range of N is N3 and N4, and N4 is a positive integer greater than or equal to N3, and N3 is an integer greater than 1, in the case that the sidelink channel congestion degree is lower than the second channel congestion threshold, the value of N is N4, and in the case that the sidelink channel congestion degree is lower than the first channel congestion threshold and higher than the second channel congestion threshold, the value of N is N3; or the service QoS threshold includes a first service QoS threshold and a second service QoS threshold, wherein the first service QoS threshold is greater than the second service QoS threshold; and in the case that it is determined that the first information is transmitted N times according to the configuration information, a value range of N is N5 and N6, and N6 is a positive integer greater than or equal to N5, and N5 is an integer greater than 1, in the case that the sidelink service QoS is higher than the first service QoS threshold, the value of N is N6, and in the case that the sidelink service QoS is higher than the first service QoS threshold and lower than the second service QoS threshold, the value of N is N5; or the first proportion threshold includes a first channel state proportion threshold and a second channel state proportion threshold, wherein the first channel state proportion threshold is greater than the second channel state proportion threshold, in the case that it is determined that the first information is transmitted N times according to the configuration information, a value range of N is N6 and N7, and N7 is a positive integer greater than or equal to N6, and N6 is an integer greater than 1, in the case that the proportion of the sidelink channel state being lower than the channel state threshold is higher than the first channel state proportion threshold, the value of N is N7, and in the cast that the proportion of sidelink channel state being lower than the channel state threshold is higher than the second channel state proportion threshold and lower than the first channel state proportion threshold, the value of N is N6; or the second proportion threshold includes a first channel congestion proportion threshold and a second channel congestion proportion threshold, wherein the first channel congestion proportion threshold is greater than the second channel congestion proportion threshold; in the case that it is determined that the first information is transmitted N times according to the configuration information, a value range of N is N8 and N9, and N9 is a positive integer greater than or equal to N8, and N8 is an integer greater than 1, in the case that the proportion of the sidelink channel congestion degree being lower than the channel congestion threshold is higher than the first channel congestion proportion threshold, the value of N is N9, and in the case that the proportion of sidelink channel congestion degree being lower than the channel congestion threshold is higher than the second channel congestion proportion threshold and lower than the first channel congestion proportion threshold, the value of N is N8.

2. The method according to claim 1, wherein the configuration information is network configuration information or pre-configured information.

3. The method according to claim 2, wherein the network configuration information is configuration information sent by a network device through a broadcast message or a radio resource control (RRC) signaling; and/or the pre-configured information is information configured by the network device or the first terminal in advance for the first terminal, or, the pre-configured information is information agreed by a protocol.

4. The method according to claim 1, wherein in the case that the first terminal determines that the first information is transmitted N times, the first terminal or the network device instructs to the second terminal at least one of the following:
a value of N; or a resource location occupied by N times of transmission of the first information.

5. The method according to claim 4, wherein the first terminal instructs through sidelink control information SCI or a sidelink RRC signaling; or the network device instructs through a broadcast message or a RRC signaling.

6. The method according to claim 5, wherein the broadcast message is used by the first terminal to determine that the first information is transmitted 1 or N times.

7. The method according to claim 1, wherein,
in the case that the first terminal enables Hybrid Automatic Repeat Request (HARQ) feedback, during one transmission process, the first information is only transmitted once; and/or
in the case that the first terminal disables the HARQ feedback, the first terminal determines, according to the configuration information, that the first information is transmitted 1 or N times.

8. The method according to claim 7, wherein the first terminal determines to enable or disable the HARQ feedback according to at least one of the following:
network configuration information, pre-configured information, a channel state, service characteristics or quality of service (QOS).

9. The method according to claim 8, wherein the network configuration information is used by the first terminal to determine that the first information is transmitted 1 or N times; or the pre-configured information is used by the first terminal to determine that the first information is transmitted 1 or N times.

10. The method according to claim 1, wherein the QoS includes at least one of the following:
reliability, a delay, a priority or a communication range.

11. The method according to claim 1, wherein in the case that the second terminal is one terminal, the link information of the sidelink meeting a preset condition refers to:
the sidelink service QoS is higher than the service QoS threshold; or
in the case that the sidelink service QoS is not higher than the service QoS threshold, the sidelink channel congestion degree is lower than the channel congestion threshold:
or,
in the case that the second terminal is a plurality of terminals, the link information of the sidelink meeting the preset condition refers to:
the sidelink service QoS is higher than the service QoS threshold; or
in the case that the sidelink service QoS is not higher than the service QoS threshold, the proportion of the sidelink channel congestion degree being lower than the channel congestion threshold is higher than the second proportion threshold.

12. The method according to claim 1, wherein at least one of the channel state threshold, the channel congestion threshold, the service QoS threshold, the first proportion threshold, or the second proportion threshold is configured by network configuration information or pre-configured information.

13. The method according to claim 1, wherein a redundancy version (RV) number of each transmission of the first information among N times of transmission of the first information is the same or different; or the RV number of each transmission of the first information among N times of transmission of the first information is agreed by the protocol or configured by the network device or pre-configured.

14. The method according to claim 1, wherein the first terminal instructs a RV number of currently transmitted information to the second terminal through SCI or a sidelink RRC signaling.

15. A terminal, being a first terminal, comprising: a transceiver, a memory, a processor, and a program stored on the memory and executed by the processor,
the processor is configured to determine that first information is transmitted 1 or N times according to configuration information, wherein N is a positive integer greater than 1;
the transceiver is configured to, if it is determined that the first information is transmitted N times, transmit the first information to a second terminal N times on a sidelink;
the transceiver is further configured to, if it is determined that the first information is transmitted once, transmit the first information to the second terminal once on the sidelink;
or,
the transceiver is configured to determine that first information is transmitted 1 or N times according to configuration information, wherein N is a positive integer greater than 1;
the transceiver is further configured to, if it is determined that the first information is transmitted N times, transmit the first information to a second terminal N times on a sidelink;
the transceiver is further configured to, if it is determined that the first information is transmitted once, transmit the first information to the second terminal once on the sidelink;
wherein in the case that link information of the sidelink meets a preset condition, the first terminal determines that the first information is transmitted N times according to the configuration information;
in the case that the link information of the sidelink does not meet the preset condition, the first information is only transmitted once during one transmission process;
wherein the link information includes a link state and/or link service information;
wherein in the case that the second terminal is one terminal, the link information of the sidelink meeting the preset condition refers to at least one of the following:
a sidelink channel state is lower than a channel state threshold;
a sidelink channel congestion degree is lower than a channel congestion threshold;
sidelink service QoS is higher than a service QoS threshold;
or,
in a case where the second terminal is a plurality of terminals, the link information of the sidelink meeting the preset condition refers to at least one of the following:
a proportion of the sidelink channel state being lower than the channel state threshold is higher than a first proportion threshold;
a proportion of the sidelink channel congestion degree being lower than the channel congestion threshold is higher than a second proportion threshold; or
the sidelink QoS is higher than the service QoS threshold;
wherein the channel state threshold includes a first channel state threshold and a second channel state threshold, the first channel state threshold is greater than the second channel state threshold; in the case that it is determined that the first information is transmitted N times according to the configuration information, a value range of N is N1 and N2, and N2 is a positive integer greater than or equal to N1, and N1 is an integer greater than 1, in the case that the sidelink channel state is lower than the second channel state threshold, a value of N is N2, and in the case that the sidelink channel state is lower than the first channel state threshold and higher than the second channel state threshold, the value of N is N1; or
the channel congestion threshold includes a first channel congestion threshold and a second channel congestion threshold, wherein the first channel congestion threshold is greater than the second channel congestion threshold; and when it is determined that the first information is transmitted N times according to the configuration information, a value range of N is N3 and N4, and N4 is a positive integer greater than or equal to N3, and N3 is an integer greater than 1, in the case that the sidelink channel congestion degree is lower than the second channel congestion threshold, the value of N is N4, and in the case that the sidelink channel congestion degree is lower than the first channel congestion threshold and higher than the second channel congestion threshold, the value of N is N3; or
the service QoS threshold includes a first service QoS threshold and a second service QoS threshold, wherein the first service QoS threshold is greater than the second service QoS threshold; and in the case that it is determined that the first information is transmitted N times according to the configuration information, a value range of N is N5 and N6, and N6 is a positive integer greater than or equal to N5, and N5 is an integer greater than 1, in the case that the sidelink service QoS is higher than the first service QoS threshold, the value of N is N6, and in the case that the sidelink service QoS is higher than the first service QoS threshold and lower than the second service QoS threshold, the value of N is N5; or
the first proportion threshold includes a first channel state proportion threshold and a second channel state proportion threshold, wherein the first channel state proportion threshold is greater than the second channel state proportion threshold, in the case that it is determined that the first information is transmitted N times according to the configuration information, a value range of N is N6 and N7, and N7 is a positive integer greater than or equal to N6, and N6 is an integer greater than 1, in the case that the proportion of the sidelink channel state being lower than the channel state threshold is higher than the first channel state proportion threshold, the value of N is N7, and in the cast that the proportion of sidelink channel state being lower than the channel state threshold is higher than the second channel state proportion threshold and lower than the first channel state proportion threshold, the value of N is N6; or
the second proportion threshold includes a first channel congestion proportion threshold and a second channel congestion proportion threshold, wherein the first channel congestion proportion threshold is greater than the second channel congestion proportion threshold; in the case that it is determined that the first information is transmitted N times according to the configuration information, a value range of N is N8 and N9, and N9 is a positive integer greater than or equal to N8, and N8 is an integer greater than 1, in the case that the proportion of the sidelink channel congestion degree being lower than the channel congestion threshold is higher than the first channel congestion proportion threshold, the value of N is N9, and in the case that the proportion of sidelink channel congestion degree being lower than the channel congestion threshold is higher than the second channel congestion proportion threshold and lower than the first channel congestion proportion threshold, the value of N is N8.

16. The terminal according to claim 15, wherein the configuration information is network configuration information or pre-configured information.

17. The terminal according to claim 15, wherein in the case that the first terminal determines that the first information is transmitted N times, the first terminal or the network device instructs to the second terminal at least one of the following:
- a value of N; or
- a resource location occupied by N times of transmission of the first information.

\* \* \* \* \*